Aug. 2, 1932.    H. J. THOMSON    1,870,076
VARIABLE SPEED GEARING
Filed June 5, 1929    4 Sheets-Sheet 1

INVENTOR.
Hedley Jeffreys Thomson
by:- A. E. O'dell
Attorney.

Aug. 2, 1932.  H. J. THOMSON  1,870,076
VARIABLE SPEED GEARING
Filed June 5, 1929  4 Sheets-Sheet 2

INVENTOR
Hedley Jeffreys Thomson
by:- A. E. Odell
Attorney.

INVENTOR.
Hedley Jeffreys Thomson
by-
Attorney.

Patented Aug. 2, 1932

1,870,076

UNITED STATES PATENT OFFICE

HEDLEY JEFFREYS THOMSON, OF WOODFORD GREEN, ENGLAND

VARIABLE SPEED GEARING

Application filed June 5, 1929, Serial No. 368,643, and in Great Britain June 26, 1928.

This invention relates to electromechanical power transmission systems in which power shaft, load shaft and a lay shaft are interconnected by a three-member epicyclic gear, and a dynamo-electric machine upon or geared to the lay shaft supplying or supplied by a dynamo-electric machine upon or geared to one of the other shafts affords a means of varying the torque transmitted to the load shaft by electrical control of the dynamo-electric machines. It is not material to which members of the gear the power, load and lay shafts are connected provided that if the load shaft is held stationary the lay shaft rotates in the opposite direction to the power shaft.

The purpose of the invention is to extend the range of application of such systems, to extend the torque range they are capable of giving, and to economize in the weight of the dynamo-electric machines employed.

To this end instead of mounting the electrical machines directly upon the shafts interconnected by the epicyclic gear, or gearing them permanently to those shafts as has been done hitherto, this invention provides for the interposition of a variable speed gear between a dynamo and the corresponding epicyclic gear shaft so that at one part of the cycle of control when the epicyclic gear shaft in question is rotating slowly the dynamo is geared up from it to a high ratio, while in another part of the cycle the gear ratio is made lower or the machine is locked direct to the shaft.

A further saving in respect of the electrical machines is achieved by using one for two purposes. To this end clutches are provided by which one dynamo may be connected to the load shaft in one part of the cycle and to the power shaft in another part. Preferably gearing is interposed between the machine and the load shaft of such ratio that when the lay shaft is stationary the load shaft dynamo clutch member is rotating at the speed of the power shaft clutch member. In this way the feature of a variable gear between a dynamo and its epicyclic gear shaft is combined with the notion of changing over the dynamo from one shaft to another.

A further means of extending the range of application and operation consists in the introduction of a second epicyclic gear having one member driven by the power shaft, the lay shaft of the first gear forming the load shaft of the second.

Examples illustrative of the application of the invention are shown in the accompanying drawings of which Figure 1 is a simplified elevation half in section of a system shown diagrammatically in Figure 2.

Figure 1:
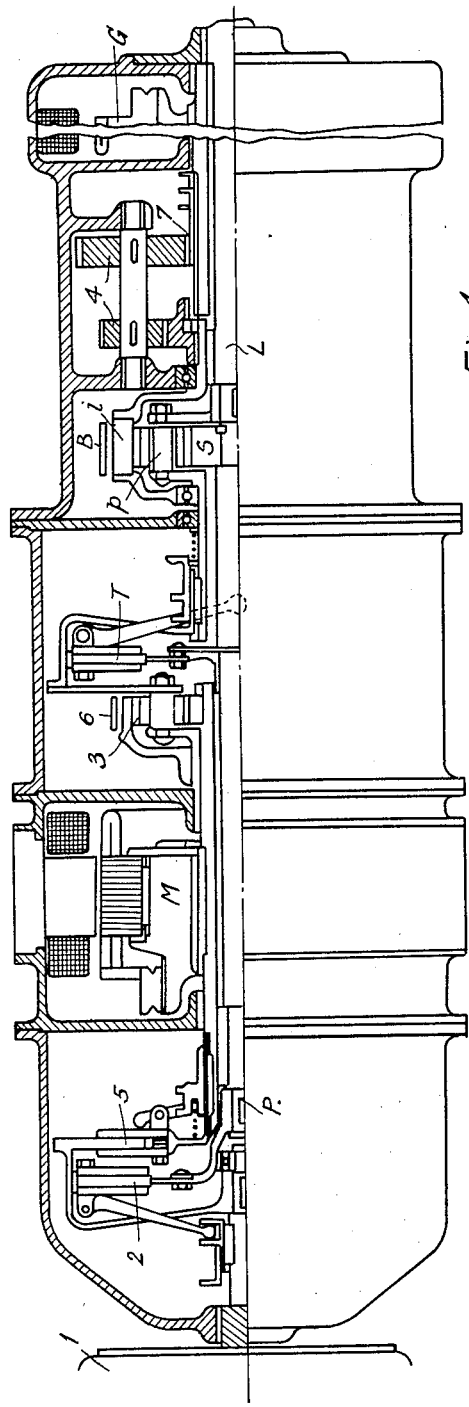
Figure 2:
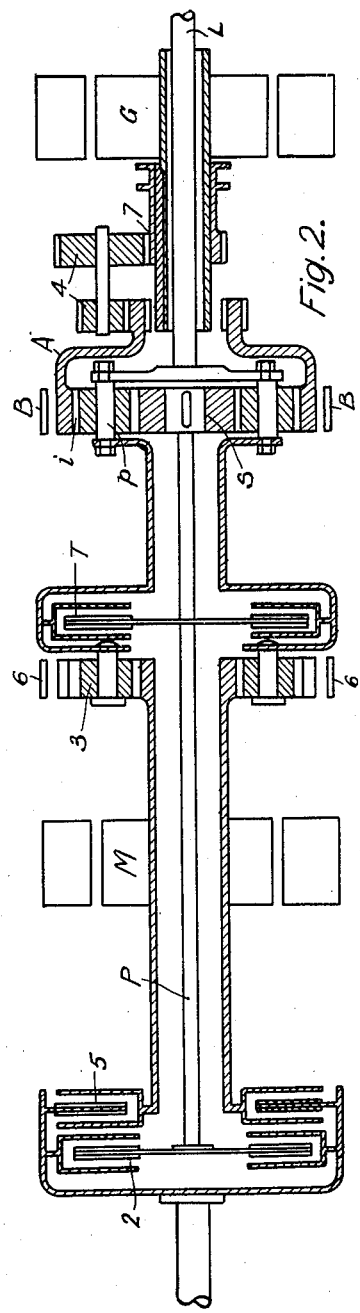

In Figures 1 and 2 a motor 1 which may be an internal combustion or other engine or an electric motor drives a power shaft P which carries a sun pinion $s$ of an epicyclic gear $s$, $p$, $i$. The planet pinion carrier $p$ is upon a load shaft L. The outer sun wheel or internally toothed wheel $i$ is upon a member representing, and herein referred to as, an auxiliary or lay shaft A. The load shaft is connected not only with the load, for instance the wheels of a vehicle, but also through a variable gear 3 with a dynamo-electric machine M. The lay shaft A is connected through variable gear 4 with a dynamo-electric machine G. Clutch T serves to lock the gear $s$, $p$, $i$, solid. Brake B serves to hold the lay shaft stationary. Clutch 5 enables dynamo M to be connected to the prime motor shaft when its driving connection through gear 3 with the load shaft has been put out of action by the release of brake 6 which normally holds stationary the internally toothed wheel of gear 3. Since clutch 2 is engaged for all normal operations of the system save starting the engine and some methods of reversing, it will be understood that connection to the prime motor shaft is also connection to the power shaft, except when starting or reversing is in question. A dog clutch 7 serves to put the gear 4 out of action by connecting dynamo G direct to lay shaft A.

A preferred scheme of control for this system is as follows. Clutch 2 being engaged and brake 6 applied dynamo G is driven by the power shaft through gears $i$, $p$, $s$ and 4. Current from this machine is fed to dynamo M and electrically regulated in well known manner, for instance by shifting the brushes of the machines, (c. f. for instance patent of J. G. P. Thomas No. 948,436 or No. 968,290). The load shaft turns when the torque exerted upon it by M through gear 3 and by P through gear $s$, $p$, $i$ (owing to the resistance of G) is sufficient to turn the load. By strengthening the field of G and weakening that of M the speed of G can be reduced to a small value when brake B may be applied and the power transmission made wholly mechanical. Dog clutch 7 may now be engaged with A. Brake 6 is then released, clutch 5 engaged, and brake B released. Machine M is then driven direct by the prime motor shaft P and may be made to supply electrical power to the machine G which now runs as a motor direct coupled to the lay shaft A. Upon the load shaft attaining the same speed as the prime motor clutch T may be engaged and the whole power transmission made mechanical again.

For starting the engine, in case it is an internal combustion engine, the machine M may be driven from a battery as described hereinafter with reference to Figure 14 and clutch 5 engaged. A reverse drive may be obtained by engaging clutches 5 and T so that M is driven mechanically by the power shaft through 5 and can supply electrical power to G, which drives the load shaft direct or through gear 4, gear $s$, $p$, $i$ being locked by T.

Figure 3:
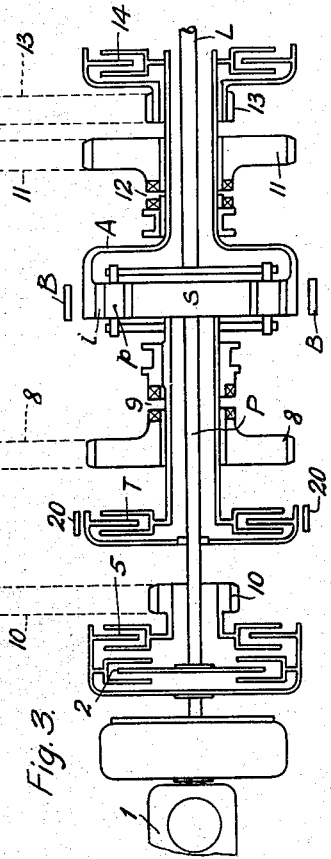

In lieu of the epicyclic type of gear 3, or the 2-speed change gear 4 any other suitable gear may be employed for the purpose of connecting a dynamo-electric machine to a shaft. In Figure 3 chains and sprockets are shown. Machine M is connected either with the load shaft through sprockets and chain 8 and dog clutch 9 or with the prime motor shaft through sprockets and chain 10 and clutch 5; as in Figures 1 and 2 there is a change of gear ratio upon change over being effected by the release of clutch 9 and engagement of clutch 5, but in this case the machine is geared to the power shaft and not directly coupled. Machine G is connected with the lay shaft A either through sprockets and chain 11 and dog clutch 12, or through sprockets and chain 13 and clutch 14. This arrangement may be used to give two reverse speeds according as clutch 12 or 14 is engaged; and such speeds may be obtained either by engaging clutch T or by holding shaft P stationary by means of brake 20. The drive is electrical as above described with reference to Figure 2; machine M is driven as a generator by prime motor 1 through clutch 5, and supplies power to G which is transmitted through 11 and 12 or 13 and 14 to A, and thence through the locked or operative gear $s$, $p$, $i$ to L.

Figure 4:
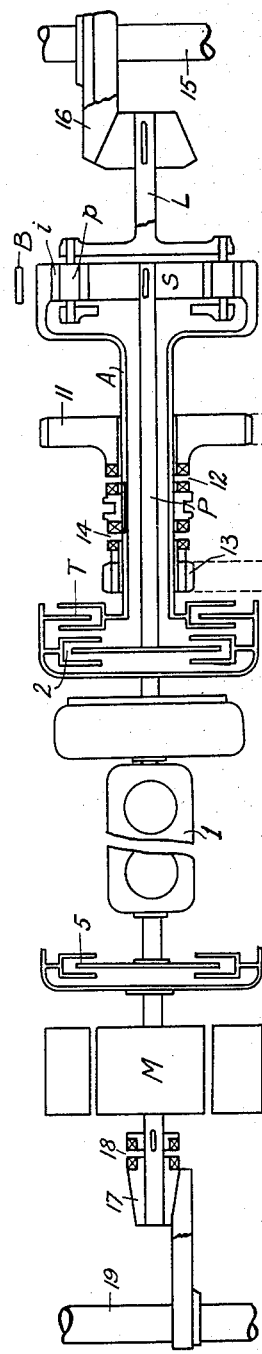
Figures 3 to 13 are diagrams corresponding with Figure 2 of other systems.

In Figure 4 the load shaft L is indicated as geared to an axle 15 of the vehicle wheels through bevel gear 16; the machine M is geared by bevel gear 17 and dog clutch 18 to another axle 19 of the vehicle; since the two axles are connected together through the wheels and the rails or road on which the vehicle runs machine M is joined to shaft L when clutch 18 is engaged and to the prime motor shaft when clutch 5 is engaged. In case of a tractor vehicle pulling a train of vehicles, other dynamo-electric machine corresponding with M may be connected with the axles of the trailer vehicles, and supplied electrically like the machine M while the latter is connected with the load shaft. In this arrangement the engine may be started by the aid of machine G driven electrically, either by engaging clutch 14 and clutch T, or by engaging clutch 5 and employing machine M as before described.

Figure 5:
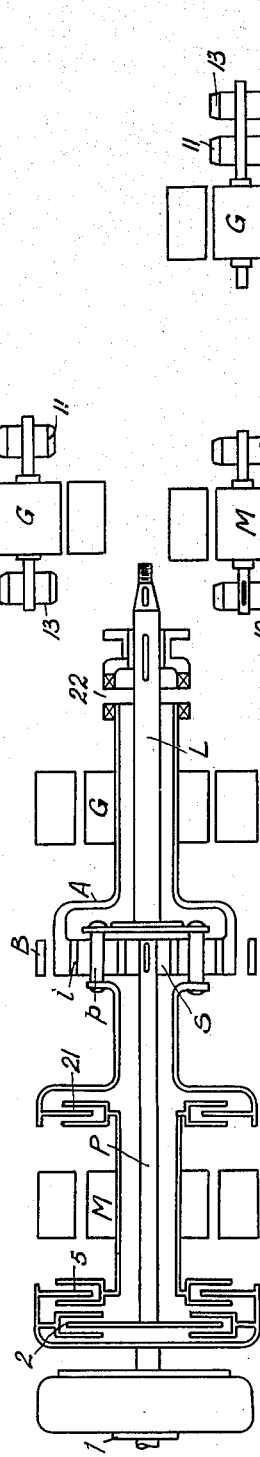

In Figure 5 there is no gearing between the dynamo-electric machines and the shafts of the epicyclic gear. The machine M may be connected either with the load shaft L by clutch 21 or with the prime motor shaft by clutch 5. If clutches 2, 5 and 21 are engaged simultaneously they have the effect of clutch T in the preceding figures, that of locking solid the gear $s$, $p$, $i$. A dog clutch 22 is engaged for reversing, for which purpose machine M is driven by the prime motor through clutch 5 and supplies electrical power to the machine G. This scheme achieves all the advantages of that described in the patent to Thomas No. 968,290 with a saving of one electrical machine.

It will have been observed that the systems described above, like those already known, afford two speeds on which the power transmission can be wholly mechanical, one when the lay shaft is held stationary, the other when the epicyclic gear is locked solid. In some cases it is convenient to arrange for additional mechanical speeds; as thereby, for a given total range of speed variation, the range of electrical control betwen two mechanical speeds is reduced and smaller dynamo-electric machines suffice. One method by which this aim may be achieved is the introduction of a variable speed gear between the load shaft and the load, for instance between shaft L and the wheels of a vehicle. The cycle of control above described is carried through with the lowest gear engaged and thereby the wheels are brought to a speed suitable for the engagement of the second gear; simultaneously with the engagement of the second gear the cycle of control is recommenced; and so on.

An arrangement offering greater advantages is the employment of a second epicyclic gear of the three-member type; the power shaft drives one member of each gear, another member of one gear drives the load shaft, another member of the other gear drives (or is driven by) the lay shaft, while the remaining members of the two gears are connected together.

Figure 6:
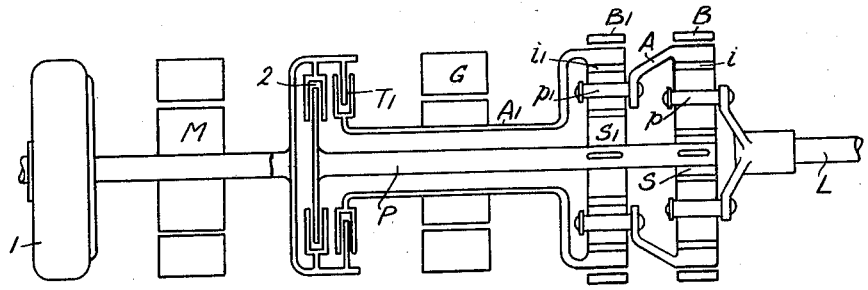

One example of this arrangement is shown in Figure 6, applied to a scheme in which the electrical machine M is permanently connected with the engine shaft, and not changed over during the cycle from load shaft to power shaft as described with reference to Figure 5. The additional epicyclic gear is $s1, i1, p1$; its sun wheel $s1$ is joined to the power shaft P, its planet pinion carrier $p1$ to the lay shaft A of the gear $s, p, i$, while its internally toothed wheel $i1$ is joined to a lay shaft A1 carrying the machine G; a brake B1 serves to hold this wheel stationary when required. In this scheme no use need be made of electrical control for low speeds; the first speed is obtained by applying brake B and engaging clutch 2; the power is transmitted wholly mechanically through gear $s, p, i$; the second speed is obtained by applying brake B1 instead of brake B; the power is transmitted wholly mechanically through the gear $s1, p1, i1$. For higher speeds both brakes are released and the machine G is supplied electrically from machine M. A top speed, on which the power transmission is again wholly mechanical, is obtained by engaging clutch T1. A reverse mechanical drive may be obtained by applying brake B and engaging clutch T1; or a reverse electrical drive may be obtained by applying brake B and supplying machine G from machine M. The engine may be started by supplying machine G from a battery and throwing in clutch T1.

Figure 7:
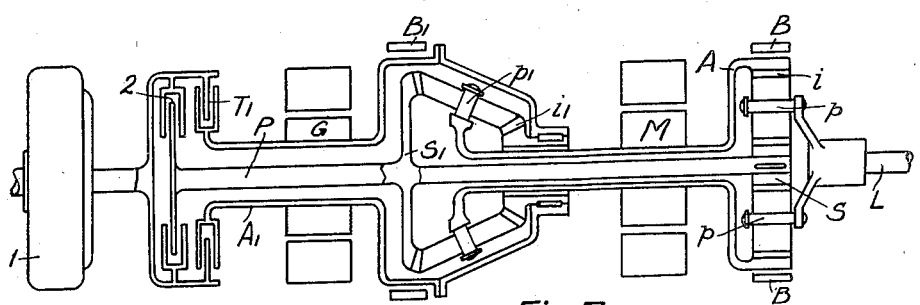

The epicyclic gears so far described have been of the spur wheel type; it is equally possible to employ bevel wheel epicyclic gears. In Figure 7 the auxiliary epicyclic gear $s1, p1, i1$ is of this type. The machine M instead of being on or connected with the load shaft L as in Figures 1 to 5, is upon the lay shaft A of the gear $s, p, i$ which forms the load shaft for the gear $s1, p1, i1$. The cycle of control for this scheme is as follows. A low speed with mechanical power transmission is obtained by applying brake B and engaging clutch 2. By releasing the brake and supplying machine M electrically from machine G the speed of L may be increased and that of G diminished until it is nearly stationary whereupon brake B1 may be applied and the electrical transmission of power eliminated. For higher speeds brake B1 is released and the machine G is supplied by the machine M, its speed being increased until it reaches that of the power shaft. Clutch T1 may then be engaged and the electrical power transmission again eliminated. The engine may be started, and a reverse speed may be obtained mechanically or electrically, as described with reference to Figure 6, save that for the electrical reverse machine M is driven from machine G instead of vice versa.

Figure 8:
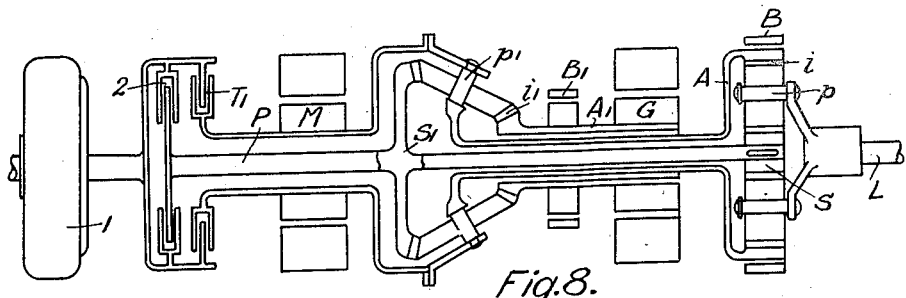

A modification of this scheme is shown in Figure 8. The change is constructional only, the lay shaft A1 being made concentric with the lay shaft A so that machine G is to the right of the gear $s1, p1, i1$, while machine M is to the left. The cycle of control is as above described; save that as clutch T1 now connects the prime motor 1 with the lay shaft A a reverse speed cannot be obtained in the manner described, and either the prime motor must be made reversible or an ordinary reverse gear added if reverse driving is required.

Figure 9:
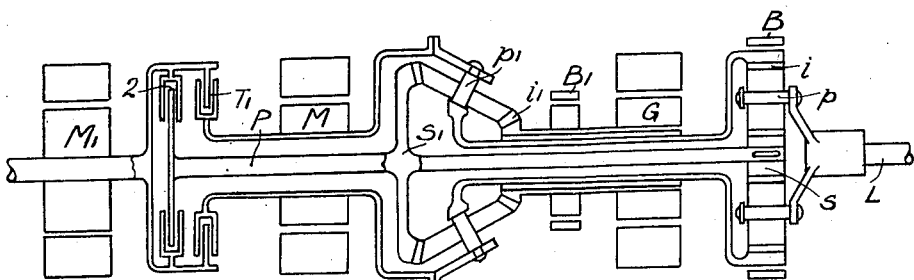

Figure 9 is the same as Figure 8 save for the addition of a third electrical machine M1 upon the prime motor shaft. This machine takes the place of machine M for those speeds on which in Figure 8 machine M supplies electrical power to machine G. A reverse speed can now be got by engaging brake B and supplying electrical power from M1 to drive G in the forward direction.

Figure 10:
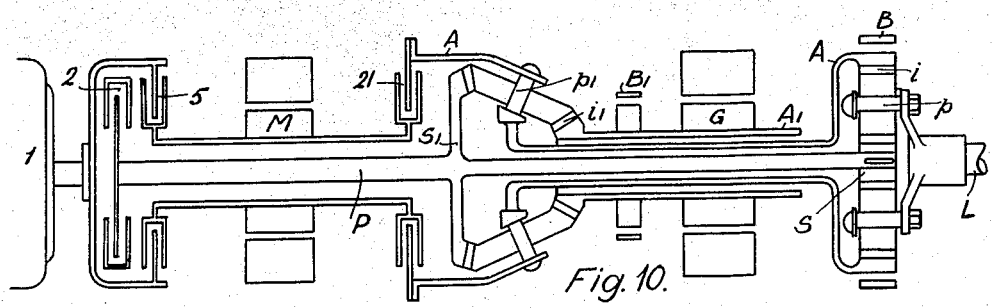

Figure 10 is a further modification of the arrangement of Figure 8, in which by the addition of a clutch 21 provision is made, substantially as in Figure 5, for connecting machine M either to the load shaft of the gear $s1, p1, i1$, that is the lay shaft A, or to the prime motor. The clutch marked T1 in Figure 8 is marked 5 in Figure 10 as in Figure 5, and as in the latter figure clutch 5 serves with the clutch 21 to perform the function of clutch T1 of Figure 8.

Figure 11:
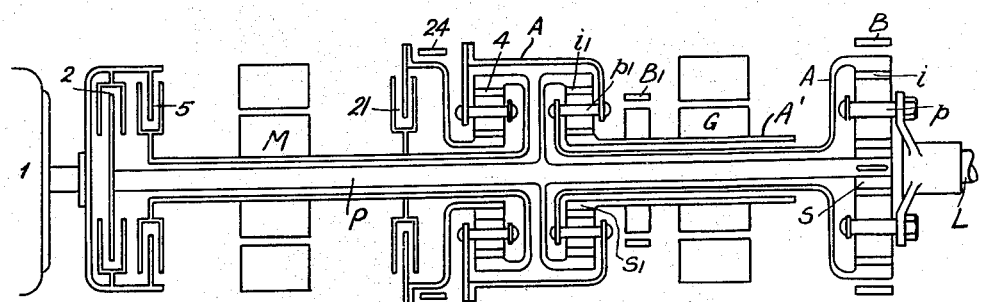

In Figure 11 the epicyclic gear $s1, p1, i1$, is of the spur gear type and a variable gear 4 is interposed between lay shaft A (of gear $s, p, i$ which is the load shaft for gear $s1, p1, i1$) and machine M. A brake 24 serves to make the gear operative. The lowest mechanical speed is obtained as before by applying brake B and engaging clutch 2. Then brake B is released and brake 24 applied and machine M is supplied electrically from the machine G until the latter is brought nearly to a standstill, when brake B1 is applied. Brake 24 is released on clutch 5 being engaged, and when brake B1 is released machine M is used as before to supply machine G. On top gear clutches 2, 5 and 21 are all engaged.

Figure 12:
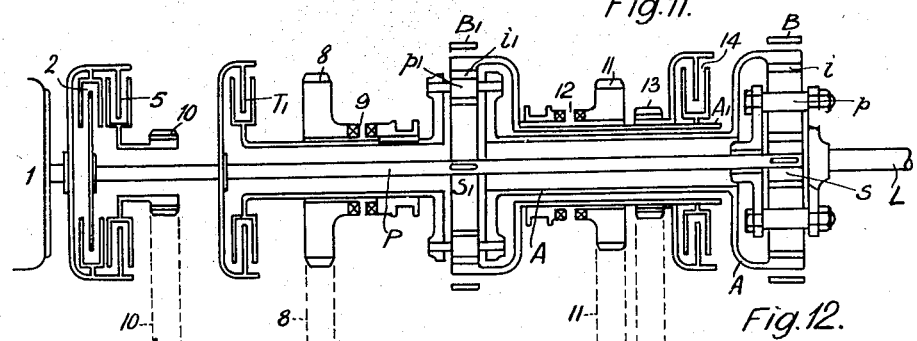

Figure 12 is another modification of Figure 8 in which the gear $s1, p1, i1$ is of the spur wheel type, while the machines M and G are geared to their respective epicyclic gear shafts by sprockets and chains as in Figure 3.

Figure 14:
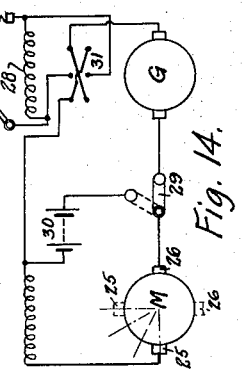
Figure 14 is a diagram of electrical connections suitable for such systems.

Figure 14 shows electrical connections suitable for the scheme of Figure 12 and generally speaking for all the schemes described so far as they call for the integers shown. Machine M is indicated as controlled by shifting its brushes 25, 26, and machine G as controlled by a variabe resistance 27 shunting it field 28. The invention is not limited to these methods of control. A switch 29 serves either to connect the machines in series or to join the battery 30 across machine M for the purpose of driving M as a motor. A reversing switch 31 serves to reverse the field of G.

To start the engine battery 30 is connected across machine M by switch 29, M is speeded up by shifting its brushes forward from the maximum torque position shown in full lines, and on a suitable speed being reached clutch 5 is engaged; on the engine starting switch 29 and brushes 25, 26 are returned to the position shown and clutch 5 is disengaged. To start the vehicle clutches 9 and 12 are engaged and then clutch 2 and brake B is gradually applied; this gives a low speed mechanical drive. Speed can be increased by releasing brake B, and gradually introducing resistance 27 into shunt with the field 28 of machine G; electrical power is then delivered to machine M. After the shunt resistance has been increased to maximum value, and if desired the shunt circuit broken, brushes 25, 26 of machine M are moved forward towards the position shown in dotted lines; by this means machine G is brought nearly to a standstill and brake B1 can then be engaged to give a second mechanical speed. For further increase of speed clutch 12 is disengaged and clutch 14 (of which both parts are stationary) and clutch 5 (of which both parts are rotating at engine speed) are engaged, and clutch 9 is disengaged. Brushes 25, 26 are then moved further forward causing machine M to generate current, and when the current is sufficient to resist the backward torque on G brake B1 is released and G is driven forward electrically. Continued movement of brushes 25, 26 ultimately brings all the members of both gears $s, p, i$, and $s1, p1, i1$, to engine speed, when clutch T1 is engaged and the drive is again mechanical, brushes 25, 26 being moved backward until the delivery of current to G ceases. If desired clutches 5 and 14 may be released and machines M and G brought to rest. A reverse speed is obtained by engaging clutches 5 and T1, and throwing over switch 31. Machine M is driven as a generator through gearing 10, and supplies power electrically to the reversed machine G which may drive through either gear 11 or gear 13, clutch T1 locking the epicyclic gears.

Figure 13:
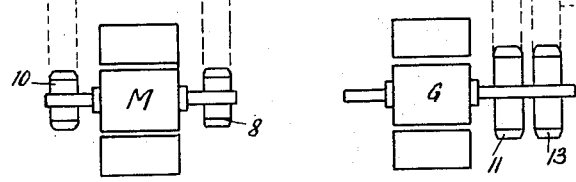
Figure 13:
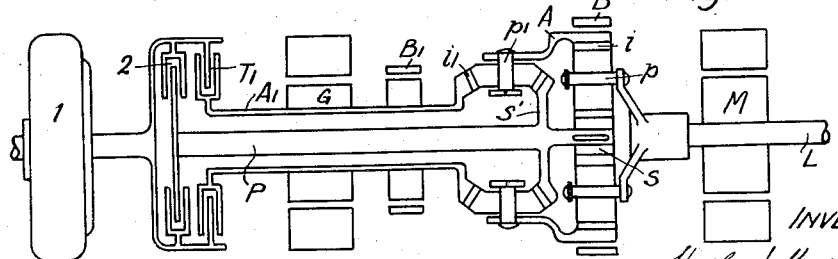

A different modification of Figure 7 is shown in Figure 13 where the machine M instead of being connected to the joined members of the two gears, i. e. to shaft A which is the lay shaft for gear $s, p, i$, and the load shaft for gear $s1, p1, i1$, is joined to the load shaft L. Provision may be made if desired for disconnecting machine M from the load shaft L and connecting it to the prime motor shaft as explained with reference to (for instance) Figure 4 or 5. In the construction of Figure 13 the gears $s, p, i$, and $s1, p1, i1$, are brought together and can conveniently be built in one gear box.

The constructions illustrated are examples only; it should be clear from them how further modifications may be made by employing in the scheme of one figure features illustrated in aonther figure; for instance it will be apparent that the gear $s\,p, i$ of any figure may be replaced by the combined gears $s, p, i$ and $s1, p1, i1$ of Figure 6, $i1$ being joined to the lay shaft A and $s$ and $s1$ to the power shaft; or the juxtaposed arrangement of gears $s, p, i$, and $s1, p1, i1$, shown in Figure 13 may be employed in Figure 7 by extending shaft A to the right as a sleeve around the load shaft.

I claim:—

1. In an electromechanical power transmission system the combination of power, load, and lay shafts, an epicyclic gearing connecting said shafts, a dynamo-electric machine connected with one of said shafts, a second dynamo-electric machine, two driving connections of different speed ratio for connecting said second dynamo-electric machine to one of the other shafts, means for rendering either of said connections operative, electrical connections between said dynamo electric machines, and electrical control means for causing said machines to supply current the one to the other.

2. In an electromechanical power transmission system, the combination of power, load, and lay shafts, an epicyclic gearing interconnecting said shafts, a dynamo-electric machine connected with the lay shaft, a second dynamo-electric machine, means for connecting said second dynamo-electric machine to the load shaft, other means for connecting said second dynamo-electric machine to the power shaft, electrical connections between said dynamo electric machines, and electrical control means for causing said machines to supply current the one to the other.

3. In an electromechanical power transmission system, the combination of power, load, and lay shafts, an epicyclic gearing interconnecting said shafts, a dynamo-electric machine connected with the lay shaft, a second dynamo-electric machine, means including a clutch for connecting said second dynamo-electric machine to the power shaft, means connecting said second dynamo-electric machine to the load shaft of such speed ratio that when the lay shaft is stationary both parts of said clutch are rotating at the same speed, electrical connections between said dynamo electric machines, and electrical control means for causing said machines to supply current the one to the other.

4. In an electromechanical power transmission system, the combination of two three-member epicyclic gears, a power shaft, means connecting said power shaft with one member of each gear, means connecting another member of the one gear with one member of the other gear, a load shaft connected with the remaining member of the one gear, a lay shaft connected with the remaining member of the other gear, a dynamo-electric machine connected with said lay shaft, a second dynamo electric machine connected with another member of said gears, electrical connections between said dynamo electric machines, and electrical controlling means for causing said machines to supply current the one to the other.

5. In an electromechanical power transmission system, the combination of two three-member epicyclic gears, a power shaft, means connecting said power shaft with one member of each gear, means connecting another member of the one gear with one member of the other gear, a load shaft connected with the remaining member of the one gear, a lay shaft connected with the remaining member of the other gear, a dynamo-electric machine connected with said lay shaft, a second dynamo-electric machine connected with another member of one of said gears, electrical connections between said dynamo electric machines, and electrical control means for causing said machines to supply current the one to the other.

6. In an electromechanical power transmission system, the combination of two three-member epicyclic gears, a power shaft, means connecting said power shaft to one member of each gear, a lay shaft connected with another member of one gear, a dynamo-electric machine connected to said lay shaft, a second dynamo-electric machine, means for connecting said second dynamo-electric machine to the power shaft, means for connecting said second dynamo-electric machine to one of the remaining members of said gears, means connecting together two of said remaining members one of each gear, a load shaft connected to the other of said remaining members, electrical connections between said dynamo electric machines, and electrical control means for causing said machines to supply current the one to the other.

7. In an electromechanical power transmission system, the combination of power, load and lay shafts, an epicyclic gearing interconnecting said shafts, a dynamo-electric machine, variable gearing connecting said dynamo-electric machine to the lay shaft, a second dynamo-electric machine connected to one of the remaining shafts, electrical connections between said dynamo electric machines, and electrical control means for causing said machines to supply current the one to the other.

8. In an electromechanical power transmission system, the combination of two three-member epicyclic gears, a power shaft driving one member of each of said gears, a dynamo-electric machine connected to another member of each of said gears, a load shaft connected with the remaining member of one gear, a second dynamo-electric machine, means connecting said second dynamo-electric machine to the remaining member of the other gear, electrical connections between said dynamo electric machines, and electrical control means for causing said machines to supply current the one to the other.

9. In an electromechanical power transmission system, the combination of two three-member epicyclic gears, a power shaft driving one member of each of said gears, a lay shaft connected to another member of one gear, a load shaft connected to another member of the other gear, means joining together the remaining members of the two gears, two dynamo-electric machines, one connected to one member of one of said gears, means for connecting the other to another member of that gear, electrical connections between said dynamo electric machines, and electrical control means for causing said machines to supply current the one to the other.

10. In an electromechanical power transmission system, the combination of two three-member epicyclic gears, a power shaft driving one member of each of said gears, a lay shaft connected to another member of one gear, a load shaft connected to another member of the other gear, means joining together the remaining members of the two gears, two dynamo-electric machines, one connected to one member of one of said gears, means for connecting the other to another member of that gear, and means for holding stationary the member of one gear not connected with the power shaft or load shaft, means for holding stationary the member of the other gear connected with the lay shaft, electrical connections between said dynamo electric machines, and electrical control means for causing said machines to supply current the one to the other.

11. In an electromechanical power transmission system, the combination of two three-member epicyclic gears, a power shaft driving one member of each of said gears, a load shaft connected to another member of one of said gears, a lay shaft connected to another member of the other gear, means joining together the remaining members of said gears, a dynamo-electric machine connected with said lay shaft, a second dynamo-electric machine, means for connecting said second dynamo-electric machine to the joined members of said gears, means for connecting said second dynamo-electric machine to the power shaft, electrical connections between said dynamo electric machines, and electrical control means for causing said machines to supply current the one to the other.

In testimony whereof I have signed my name to this specification.

HEDLEY JEFFREYS THOMSON.